United States Patent [19]

Le Viet

[11] Patent Number: 5,514,853
[45] Date of Patent: May 7, 1996

[54] MICROWAVE TUNNEL HEATING APPARATUS

[75] Inventor: Toai Le Viet, Sentier de Clies, Switzerland

[73] Assignee: Nestec S.A., Vevey, Switzerland

[21] Appl. No.: 303,528

[22] Filed: Sep. 9, 1994

Related U.S. Application Data

[62] Division of Ser. No. 71,760, Jun. 9, 1993, Pat. No. 5,372,828.

[30] Foreign Application Priority Data

Jun. 29, 1992 [EP] European Pat. Off. ............ 92110950

[51] Int. Cl.⁶ .................................................. H05B 6/78
[52] U.S. Cl. ...................... 219/700; 219/701; 219/729; 219/684; 426/243
[58] Field of Search ........................... 219/700, 701, 219/699, 728, 729, 684, 685; 426/241, 243, 107, 234; 99/DIG. 14, 451

[56] References Cited

U.S. PATENT DOCUMENTS

| | | | |
|---|---|---|---|
| 2,500,752 | 3/1950 | Hanson et al. | 219/700 |
| 3,261,959 | 7/1966 | Connell et al. | 219/700 |
| 3,469,996 | 9/1969 | Endres et al. | |
| 3,519,517 | 7/1970 | Dench . | |
| 3,699,899 | 10/1972 | Schiffmann et al. | 219/700 |
| 4,045,638 | 8/1977 | Chiang et al. | 219/685 |
| 4,168,418 | 9/1979 | Bird . | |
| 4,280,033 | 7/1981 | Wagener et al. | |
| 4,343,979 | 8/1982 | Barbini et al. | |
| 4,698,472 | 10/1987 | Cox et al. | 219/728 |
| 4,800,090 | 1/1989 | August | 426/243 |
| 5,207,151 | 5/1993 | LeViet et al. | |

FOREIGN PATENT DOCUMENTS

| | | |
|---|---|---|
| 4710089 | 7/1990 | Australia . |
| 0350564A1 | 1/1990 | European Pat. Off. . |
| 0354277A1 | 2/1990 | European Pat. Off. . |
| 2443205 | 7/1980 | France . |

*Primary Examiner*—Philip H. Leung
*Attorney, Agent, or Firm*—Vogt & O'Donnell

[57] ABSTRACT

An apparatus assembly for heating a product has a tunnel and microwave generators positoned for generating a microwave field zone within the tunnel. A conveyor belt extends within the tunnel for passing a product through the tunnel. A plate formed of a material impermeable to microwaves is positioned in the tunnel so that an entire width of the belt passes over the plate in the microwave field zone so that microwave energy is reflected away from the belt. In addition, heating elements for generating an infrared energy zone and a further conveyor belt may be positioned so that a product passed through the tunnel then is passed by the further conveyor belt through the infrared energy zone.

13 Claims, 1 Drawing Sheet

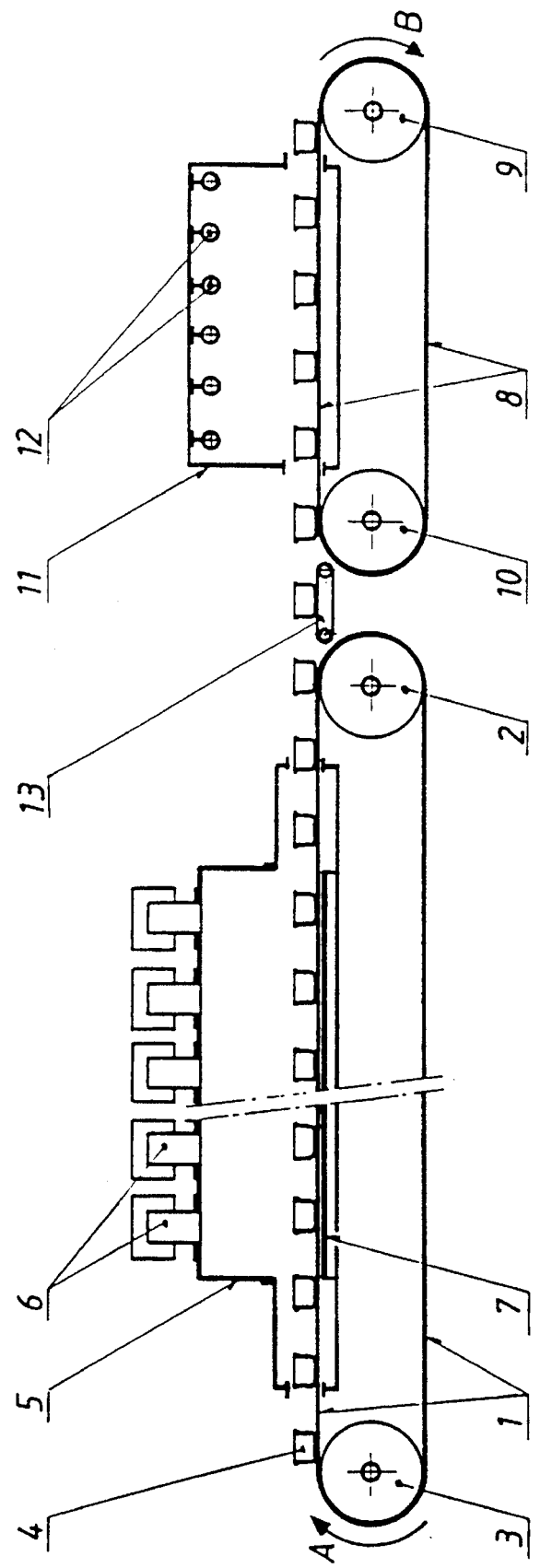

MICROWAVE TUNNEL HEATING APPARATUS

CROSS REFERENCE TO RELATED APPLICATION

This application is a divisional application of application Ser. No. 08/071,760, filed Jun. 9, 1993, U.S. Pat. No. 5,372,828.

BACKGROUND OF THE INVENTION

This invention relates to microwave heating devices with reflecting means and infrared heating devices.

It is known that caramel custard desserts can be produced using conventional heating systems, for example electric plates. In this case, the custard desserts pass through a tunnel equipped with such a heating system, two rows of custard desserts being arranged side by side. The disadvantage of this arrangement is that it necessitates a long cooking time and a tunnel of considerable length. On the other hand, the reflection of energy by the side walls of the tunnel results in an excessive increase in the temperature of the custard desserts situated close to those walls so that the caramel starts to boil and diffuses into the custard. This is totally unacceptable and results in a large number of rejects.

The problem addressed by the present invention was to provide producers of caramel custard with a process and an apparatus in which the setting time would be reduced (for a conventional system, it is of the order of 16 to 18 minutes for an initial custard temperature of the order of 60° C.) and mixing between the caramel and the custard would be avoided during cooking of the custard.

SUMMARY OF THE INVENTION

The present invention provides an apparatus assembly for heating a product comprising a microwave heating assembly having a tunnel and having microwave generators positoned for generating a microwave field zone within the tunnel. A conveyor belt extends within the tunnel for passing a product through the tunnel, and a plate formed of a material impermeable to microwaves is positioned so that an entire width of the belt passes over the plate in the microwave field zone so that microwave energy is reflected away from the belt.

In a further embodiment of an apparatus in accordance with the invention, heating elements for generating and infrared energy zone and a further conveyor belt are positioned so that a product passed through the tunnel then is passed by the further conveyor belt trough the infrared energy zone.

DESCRIPTION OF PREFERRED EMBODIMENTS AND USES

In the apparatus according to the invention, the material which forms the microwave barrier plate may be any electrically conductive metal, particularly iron, copper, or aluminum. Aluminium is preferred for reasons of cost and lightness. However, any other metal, of course, may be used.

The plate used is between 1 and 5 mm thick. The plate also acts as a support for the conveyor belt, and therefor it should not be too thin. Nor should it be too thick, otherwise it would tend to be heated unnecessarily and to transfer this energy to the conveyor belt.

The microwave tunnel is between 6 and 9 meters in length and has a power output of 20 to 90 KW.

The apparatus of the present invention enables carrying out a process wherein a liquid custard mix contained in a container for the production of custard product in which the custard is exposed to a microwave field in such a way that it leaves the microwave field at a temperature of 90 to 95° C. and the base of the custard liquid mix in the container is protected during its passage through the microwave field by a material which reflects microwaves. The material which protects the base of the custard mix is arranged beneath the custard. For preparation of a caramel custard, a layer of caramel is at the bottom of the container, the layer of mix for the custard being on top.

In practice of the process, a protective effect is required so that the microwave field energy which arrives from above and which penetrates and is absorbed by the custard base is minimal on reaching the caramel layer. The microwave energy arriving from below is reflected by the material forming a barrier. The microwave energy arriving beside the custard is also reflected by the barrier layer and the addition of the incident wave and the reflected wave gives a minimum at the bottom of the container where the caramel layer is situated. The process according to the invention gives a caramel having a temperature of the order of 75° C., i.e., well below the boiling temperature, on leaving the microwave field. In addition, the process according to the invention provides for very even setting and for high uniformity of the final temperature.

The custard may be set in accordance with the process from liquid custard mix having a temperature, prior to entering the microwave field, of from 10° C. to 60° C., i.e., after preheating, for example by a heat exchanger. Before exposure to the microwave treatment, the containers are filled with caramel and liquid mix by means of known dispensing systems.

For a liquid custard mix entering at 12° C., the heating time is of the order of 6 minutes. For a liquid custard mix entering at 60° C., the heating time is of the order of 3 minutes.

Taking industrial requirements into account, throughputs of 2,000 to 12,000 containers per hour have to be reached, for example by arranging six rows of containers to pass through the microwave field.

The custard desserts pass through the microwave field at a rate of 1 to 3 m/minute.

Passage through the microwave field does not produce a firm custard, but merely initiates the setting process. Accordingly, it is of advantage for the custard desserts to pass through an infrared energy zone on leaving the microwave field. On the one hand, this sets the custard firmly and, on the other hand, browns the upper layer of the custard (hardening). Passage through the infrared zone lasts 2 to 6 minutes, depending on the power of the electric plates used. To this end, the apparatus further comprises a conveyor belt for passage through an infrared zone. This zone has a power output of from 8 to 12 KW.

The apparatus according to the invention enables a caramel custard to be made in a shorter time by comparison with a conventional system. The apparatus according to the invention is fairly reduced in size and operates at an industrially acceptable rate.

The raw material for the caramel custard is prepared with commercial liquid caramel, and the liquid custard is prepared by mixing skimmed milk, skimmed milk powder, sugar, water and whole egg.

BRIEF DESCRIPTION OF THE DRAWING

The invention is described with reference to the accompanying drawing which illustrates an apparatus of the invention schematically.

DETAILED DESCRIPTION OF THE DRAWING AND OPERATIONAL EXAMPLE

The conveyor belt (1) supports the containers (4) containing 5 g of caramel and 95 g liquid custard mix and advances according to arrow A on rollers (2,3) and pass to the microwave heating assembly comprising tunnel (5) which is configured for extending horizontally end-to-end and through which belt (1) extends, and comprising 12 microwave generators (6). Each generator has as power of 6 KW. The custards enter at a temperature of 60° C. and leave after 2 min 40 sec at a temperature of 93° C. The tunnel has an apposed top and bottom and length of 8 m. The metallic plate (7) giving protection to the caramel layer is aluminium of a thickness of 2 mm and is positioned above the tunnel bottom, extending. By disposing 12 rows of containers spaced from 20 mm maximum, we can reach a throughput of 10–12000 custards per hour.

On leaving the microwave tunnel, the containers (4) pass from the connecting conveyor belt (13) onto a conveyor belt (8) advancing in the direction of the arrow B on return rollers (9, 10) into an infrared zone (11) comprising heating elements (12). The infrared energy amounts to 9.6 KW.

The custard desserts remain in the infrared zone for 2 minutes and leave at a temperature of the order of 98° C. However, the caramel remains at a temperature of 75° C. In this way, the custard is firmly set and the upper part of the dessert is browned.

I claim:

1. An apparatus assembly for heating a product comprising:

a microwave heating assembly comprising (a) a horizontally extending tunnel having an opposed top and bottom and (b) microwave generators positioned for generating a microwave field zone within the tunnel;

a conveyor belt which extends horizontally within the tunnel, above the tunnel bottom, for passing a product through the tunnel; and a plate formed of a material impermeable to microwaves and positioned in the tunnel, extending beneath the entire width of the belt in the microwave field zone, so that, in operation, generated microwave energy below the plate in the microwave field zone is reflected away from the belt.

2. An apparatus assembly according to claim 1 further comprising heating elements for generating an infrared energy zone and a second conveyor belt wherein the second conveyor and heating elements are positioned for passing a product passed through the tunnel through the infrared energy zone on the second conveyor belt.

3. An apparatus assembly according to claim 2 further comprising a third conveyor belt positioned between the tunnel conveyor belt and the second conveyor belt for passing a product passed through the tunnel to the second conveyor belt.

4. An apparatus assembly according to claim 1 or 2 wherein the plate is positioned at a position for supporting the tunnel conveyor belt.

5. An apparatus assembly according to claim 1 or 2 wherein the microwave generators have a power output of from 20 KW to 90 KW.

6. An apparatus assembly according to claim 2 wherein the heating elements have a power output of from 8 KW to 12 KW.

7. An apparatus assembly according to claim 6 wherein the microwave generators have a power output of from 20 KW to 90 KW.

8. An apparatus assembly according to claim 1 wherein the plate is formed of an electrically conductive metal.

9. An apparatus assembly according to claim 1 wherein the plate is formed of a metal selected from the group consisting of iron, copper and aluminum.

10. An apparatus assembly according to claim 8 or 9 wherein the plate has a thickness of between 1 mm and 5 mm.

11. An apparatus assembly according to claim 1 wherein the plate is formed of aluminum.

12. An apparatus assembly according to claim 11 wherein the plate has a thickness of between 1 mm and 5 mm.

13. An apparatus assembly according to claim 1 wherein the tunnel has a length of between 6 meters and 9 meters.

* * * * *

UNITED STATES PATENT AND TRADEMARK OFFICE
CERTIFICATE OF CORRECTION

PATENT NO. : 5,514,853
DATED : May 7, 1996
INVENTOR(S) : Toai LE VIET

It is certified that error appears in the above-identified patent and that said Letters Patent is hereby corrected as shown below:

Column 1, line 48, "and" should be --an--.

Column 3, line 18, "apposed" should be --opposed--.

Column 3, line 21, after "extending", insert --beneath the entire width of the belt in the microwave field zone.--.

Signed and Sealed this

Sixth Day of August, 1996

*Attest:*

BRUCE LEHMAN

*Attesting Officer*  Commissioner of Patents and Trademarks